Aug. 28, 1934.   G. H. COXON   1,971,677
THERMAL TREATMENT OF HYDROCARBON GASES
Filed July 26, 1930
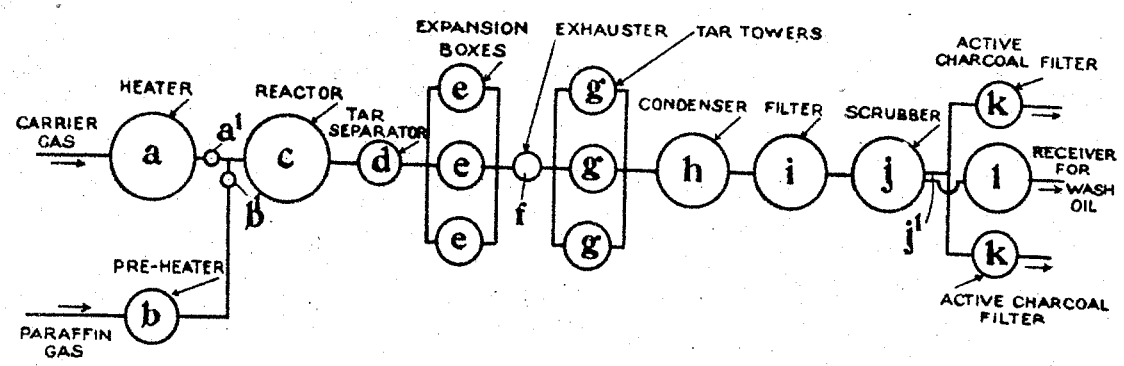
Inventor
G. H. Coxon.
by
W. E. Evans,
Attorney.

Patented Aug. 28, 1934

1,971,677

UNITED STATES PATENT OFFICE 1,971,677

THERMAL TREATMENT OF HYDROCARBON GASES

George Howard Coxon, London, England, assignor, by mesne assignments, to Gasoline Products Company, Incorporated, a corporation of Delaware Application July 26, 1930, Serial No. 470,814
In Great Britain August 21, 1929

9 Claims. (Cl. 196—10)

This invention relates to the thermal treatment of hydrocarbon gases containing aliphatic gaseous hydrocarbons, namely; paraffins or olefines, such as natural gas or the residual gas from cracking plants.

The invention has among its objects to effect the progressive and uniform application of heat to within a narrow temperature range, to avoid the loss and inefficiency commonly caused in the thermal treatment of such gases by the application of heat through highly heated metal surfaces, and to effect the application of heat under conditions of effective control of temperature and time contact, for securing a high yield of aromatic liquids or other useful products.

According to the invention heat is applied to the gas containing aliphatic hydrocarbon gases to be treated for the production therefrom of aromatic hydrocarbon liquids by admixing with it another gas that is adapted to serve as the vehicle of heat in the treatment, prior to or upon the admission of the gas into a reactor or into a series of reactors that may be of large capacity, or into reaction tubes within which the mixed gases are heated to and maintained at the temperature required for the consummation of the reactions involved in the treatment, the mixed gases thence passing through units of plant such as commonly employed for the recovery of the condensible vapours and for the utilization of the residual gas in known manner. By such means the gas to be treated is heated uniformly to within a narrow temperature range with resulting efficiency in the utilization of heat and in the process conditions, and with consequent high yield of aromatic liquid products and a low or a minimum production of carbon.

The heating or carrier gas may be admixed with the gas to be treated, under conditions in which the proportion of the respective gases may be varied within a wide range at will, and by which the temperature and extent of dilution of the treated gas may thus be conveniently controlled. The gas to be treated may be injected into the stream of the heating or carrier gas as it enters into the reactor or into the first of a series of reactors or into the reaction tubes, the heating or carrier gas being for example projected through an annular nozzle surrounding a central nozzle through which the gas to be treated passes, or the heating or carrier gas may be injected into the stream of the gas to be treated. Provision may be made, such as by valves, for the control of the gas streams adjacent the position of entry into the reactor or reaction tubes. Again, the heating or carrier gas may be admitted through a number of nozzles under control, or at a number of positions in the course of the treated gas through the reactor or reactors or through the reaction tubes. Thus, further additions of heating or carrier gas may be admitted at the point of entry of the treated gas into the second or the further reactors or reaction tubes in the series, when such are employed. Again, the heating or carrier gas may be admitted at one of a number of positions into the reaction tubes connected in series or in parallel or otherwise formed in coils or banks of connected lengths of tubing through which the gas to be treated also passes.

The mixed gases on leaving the reactor or reactors or reaction tubes may pass through a tar separator or hydraulic main, and thence into a vessel of large capacity or into a series of such vessels, in which the gases may be cooled and in which carbon may be deposited. Such a vessel or vessels may be provided with contact surfaces or baffles or with inert packing material. Instead or in addition, the mixed gases may be passed through a scrubber in which the gases may be cooled to a determined temperature on leaving the reactor or the last reactor of the series, and in which scrubber the gases may be sprayed or washed with a liquid such as a suitable petroleum stock. The mixed gases may thence pass to known apparatus for the recovery of the heavy tar and solids and the light aromatic condensate.

Again, the gas to be treated may be preheated before admission into the reaction tubes or reactors, whereby waste heat from any available heating furnace may be profitably used, and the gas to be treated may thus be heated to a temperature substantially below that at which the reactions involved in the treatment are subsequently carried out.

Furthermore, in addition to the application of heat to the gas to be treated by admixture with it of the heating or carrier gas, the reactor or reactors or the reaction tubes may have heat externally applied, or may be suitably lagged or enclosed to avoid radiation losses. It will, however, be understood that it is one of the objects of the invention to avoid the consequences of the application of high temperatures to the walls of the reactors or reaction tubes, and that the conditions are determined accordingly and are preferably such that the heating in the reactors or reaction tubes is effected exclusively by the heated carrier gas.

The invention accordingly comprises the modifications indicated that may be carried out in plant of widely varying construction, and also comprises the features of method hereinafter described.

The process of the invention is diagrammatically indicated in the accompanying drawing.

In carrying the invention into effect the heating or carrier gas as well as the gas to be treated may be supplied to the plant through a rotary pump or compressor, and the heating or carrier gas may for example be the residual permanent gas actually produced in the treatment, or it may be any other gas not necessarily affected in the treatment to which the gaseous paraffins or olefines are subjected. The carrier gas may be heated to a high temperature within a blast stove or heater $a$, of which a pair may be provided, and the heaters adapted for alternate use for the continuous application of heat to the heating or carrier gas at a temperature for example of from 1800° C. to 2000° C. when the gas to be treated contain gaseous paraffins. The gas containing gaseous paraffins, may be preheated prior to the treatment in a preheater $b$ to a temperature for example of from 200 to 300° C. or more as hereinbefore described, and the proportion of the gases may be adjusted within a wide range by such means as valves $a^1$, $b^1$, whereby on entry into the reactor $c$ the mixture may have a temperature of from 650° C. to 1250° C. according to the composition of the treated gas, and the proportion of the mixture, the temperature being raised to the determined degree at which the gas to be treated is to be maintained for the short period of the reactions before the discharge of the mixture from the reactor. It will however be understood that no limitation is imposed to the determined maximum temperature, as this may be varied according to the proportion of the heating or carrier gas used, and the content of methane or other paraffin gases or their proportion in the gas to be treated. In the treatment of a gas containing olefines the temperature to which the carrier gas is heated may be substantially reduced from that indicated for the treatment of a gas containing gaseous paraffins: whereby the mixture on entry into the reactor may have a temperature for example of from 450° C. to 750° C.

Furthermore it is preferred to carry out the treatment without employing catalysts, but catalysts may be used in the treatment, and the catalysts or the catalytic material may be packed or laid within the reactor, reactors or reaction tubes. Again the reactors or the reaction tubes employed may be made of metal or other material that may act catalytically.

The operating conditions may be such as to impose a low or moderate pressure within the system although no limitation is involved to the pressures employed, and the operating conditions may be such as to determine the velocity of the mixed gases in their course through the reactor, the velocity being reduced in passing through other units of the plant as may be required in order to secure the desired process conditions in them, while an exhauster or exhausters may be connected in the plant, for example after the reactors or elsewhere, and any means for controlling the volume and velocity of the gas streams may be employed, whereby the period of time contact and temperature during the short period of the reactions may thus be conveniently determined by the control of the gas streams.

The treated gas may pass to apparatus for the recovery of the heavy tar and solids and for the recovery of the light aromatic liquid condensate, and units of the plant commonly employed for the purpose may be employed. Thus as illustrated in the accompanying drawing the mixed gas on issue from the reactor $c$ may pass through a tar separator $d$ and thence to expansion boxes $e$. In the expansion boxes the gas is suddenly reduced in velocity and is cooled, and carbon deposits therein. For this purpose the expansion boxes $e$ may have mounted within them baffles or contact surfaces or contact material, and the upward streams of gas may be sprayed with water or other liquid that may be preheated before admission, and the gas on leaving the expansion boxes $e$ may have its temperature thus under control within a determined range. An exhauster $f$ may be provided immediately in front of the expansion boxes $e$ and the gas may thence pass to tar towers $g$ for the interception of tar and napthalene, and thence through a condenser $h$ for the condensation of tar and lighter hydrocarbons. A filter $i$ may be provided beyond the condenser $h$ for the removal of all traces of tar fog formed in the decomposition of the gas; and a gas oil or other absorption apparatus or scrubber $j$ may be provided for the removal of the light vapours. The gas may leave through the outlet pipe $j^1$, and wash oil may thence pass from the scrubber $j$ to a receiver $l$. The gas on leaving the scrubber $j$ may however first be passed through one of two filters $k$ provided for alternate use each charged with activated charcoal or other adsorbent substance for the removal of any remaining light vapours from the treated gas.

Pyrometer contacts may be provided in a number of positions in the reactor and elsewhere in the course of the gases through the plant to ensure precision of temperature control, and meters may be employed for the indication of the proportions of the respective gases passing into the reactors.

The carbon monoxide when present in the residual gas may be used with hydrogen formed during the treatment for the production of organic products such as oxygenated derivatives of the hydrocarbons, for example, alcohols, aldehydes, ketones, organic acids and the like; and for this purpose the residual gas may be enriched to the extent required by suitable additions of hydrogen or carbon monoxide to yield such products under known process conditions. The olefines formed may be used for alcohol or ester production while the liquid aromatics and the heavier olefines may be used in the production of anti-detonating motor spirit. The residual gas or part of it in its issue from the plant may in known manner be used for the production of carbon black by heating the gas to a high temperature within a retort, or by its combustion with a restricted supply of air.

It will be understood that the treatment according to the invention is confined to hydrocarbon gases and does not extend to the treatment of vapours.

I claim:

1. A method for the thermal treatment of hydrocarbon gases containing aliphatic gaseous hydrocarbons, for the production of condensible liquids, consisting in causing a confined and elongated stream of the gas to be treated having a restricted cross-sectional area to pass into a confined and elongated stream of an inert carrier gas, the carrier gas also of restricted cross-sectional area being heated to an extent substantially in excess of the reaction temperature, passing the united carrier gas and gas to be treated into a reaction chamber, and maintaining the gases at a determined temperature and for a determined time within the said chamber, and separating the condensible liquids from the gases after leaving the said chamber.

2. A method for the thermal treatment of hydrocarbon gases containing aliphatic gaseous hydrocarbons, for the production of condensible liquids, consisting in causing a confined and elongated stream of the gas to be treated having a restricted cross-sectional area to pass into a confined and elongated stream of an inert carrier gas also having a restricted cross-sectional area, the carrier gas being heated to an extent substantially in excess of the reaction temperature, passing the united carrier gas and gas to be treated into a reaction chamber, controlling the flow of the carrier gas and of the gas to be treated whereby the gases are maintained in the reaction chamber at a temperature from 450 to 1250° C. for a determined time, and separating the condensible liquids from the gases after leaving the said chamber.

3. A method for the thermal treatment of hydrocarbon gases containing aliphatic gaseous hydrocarbons, for the production of condensible liquids, consisting in causing a confined and elongated stream of the gas to be treated having a restricted cross-sectional area to pass into a confined and elongated stream of an inert carrier gas also having a restricted cross-sectional area, the carrier gas being heated to a temperature of from 1800° to 2000° C., passing the united carrier gas and gas to be treated into a reaction chamber and maintaining the gases at a determined temperature and for a determined time within the said chamber, and separating the condensible liquids from the gases after leaving the said chamber.

4. A method for the thermal treatment of hydrocarbon gases containing olefines, consisting in causing a confined and elongated stream of the gas to be treated having a restricted cross-sectional area to pass into a confined and elongated stream of an inert carrier gas also having a restricted cross-sectional area, the carrier gas being heated to an extent substantially in excess of the reaction temperature, passing the united carrier gas and gas to be treated into a reaction chamber, controlling the flow of the carrier gas and of the gas to be treated whereby the gases are maintained in the reaction chamber at a temperature from 450 to 750° C. for a determined time, and separating the condensible liquids from the gases after leaving the said chamber.

5. A method for the thermal treatment of hydrocarbon gases containing olefines, consisting in causing a confined and elongated stream of the gas to be treated having a restricted cross-sectional area to pass into a confined and elongated stream of an inert carrier gas also having a restricted cross-sectional area, the carrier gas being heated to an extent substantially in excess of the reaction temperature, passing the united carrier gas and gas to be treated into a reaction chamber, controlling the flow of the carrier gas and of the gas to be treated, whereby the gases are maintained in the reaction chamber under pressure and at a temperature from 450 to 750° C. for a determined time, and separating the condensible liquids from the gases after leaving the said chamber.

6. A method for the thermal treatment of hydrocarbon gases containing aliphatic gaseous hydrocarbons, for the production of condensible liquids, consisting in causing a confined and elongated stream of the gas to be treated having a restricted cross-sectional area, after first being heated to a temperature substantially below that at which the gas is to be thermally heated to pass into a confined and elongated stream of an inert carrier gas also having a restricted cross-sectional area, the carrier gas being heated to an extent substantially in excess of the reaction temperature, passing the united carrier gas and gas to be treated into a reaction chamber and maintaining the gases at a determined temperature and for a determined time within the said chamber, and separating the condensible liquids from the gases after leaving the said chamber.

7. A method for the thermal treatment of hydrocarbon gases containing aliphatic gaseous hydrocarbons, for the production of condensible liquids, consisting in causing a confined and elongated stream of the gas to be treated having a restricted cross-sectional area to pass into a confined and elongated stream of an inert carrier gas also having a restricted cross-sectional area, the carrier gas being heated to an extent substantially in excess of the reaction temperature, passing the carrier gas with the gas to be treated into a reaction chamber, and maintaining the gases within the reaction chamber at a temperature of from 650 to 1250° C. for a determined time, and separating the condensible liquids from the gases after leaving the said chamber.

8. A method for the thermal treatment of hydrocarbon gases containing aliphatic gaseous hydrocarbons, for the production of condensible liquids, consisting in causing a confined and elongated stream of the gas to be treated having a restricted cross-sectional area to pass into a confined and elongated stream of an inert carrier gas also having a restricted cross-sectional area, the carrier gas being heated to an extent substantially in excess of the reaction temperature, passing the united carrier gas and gas to be treated into a reaction chamber, passing further confined streams of the heated inert carrier gas into the stream of mixed gases in their course, and maintaining the gases at a determined temperature and for a determined time within the said chamber, and separating the condensible liquids from the gases after leaving the said chamber.

9. A method for the thermal treatment of hydrocarbon gases containing aliphatic gaseous hydrocarbons, for the production of condensible liquids, consisting in causing a confined and elongated stream of the gas to be treated having a restricted cross-sectional area to pass into a confined and elongated stream of an inert carrier gas also having a restricted cross-sectional area, the carrier gas being heated to an extent substantially in excess of the reaction temperature, and passing the united carrier gas and gas to be treated into a series of reaction chambers, passing a further confined stream of the inert carrier gas into the admixed gases in their course, and maintaining the gases at a determined temperature and for a determined time within the said reaction chambers, and separating the condensible liquids from the gases after leaving the said chambers.

GEORGE HOWARD COXON.